Nov. 26, 1935.  I. H. JUDD  2,022,376
MEANS FOR TRANSPORTING VEHICLES AND THE LIKE
Filed Feb. 18, 1935
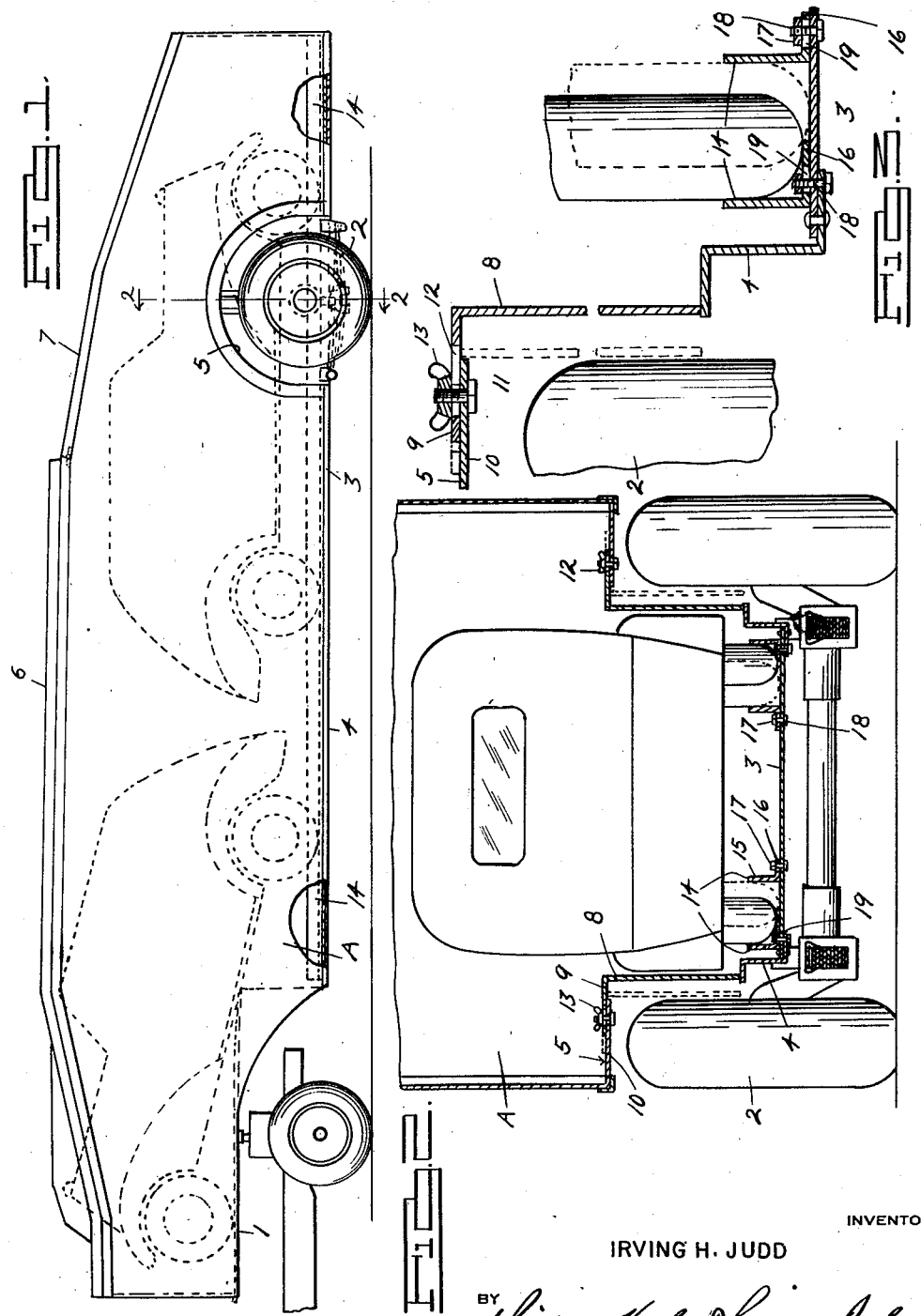
INVENTOR
IRVING H. JUDD
BY
ATTORNEY Patented Nov. 26, 1935

2,022,376

UNITED STATES PATENT OFFICE 2,022,376

MEANS FOR TRANSPORTING VEHICLES AND THE LIKE

Irving H. Judd, Dearborn, Mich., assignor to Whitehead & Kales Company, River Rouge, Mich., a corporation of Michigan Application February 18, 1935, Serial No. 7,131

5 Claims. (Cl. 280—33.1)

This invention relates generally to the transportation of automobiles and refers more particularly to an enclosed transport of the two-deck carry-car type.

One of the essential objects of the invention is to provide a transport of this type wherein provision is made for loading, carrying in transit, and unloading automobiles with safety, i. e., without such automobiles colliding with and being damaged by the wheel housings or other upright side portions of the transport.

Another object is to provide a transport capable of carrying automobiles of various over-all widths.

Another object is to provide a transport wherein provision is made for guiding longitudinally and centrally of the transport automobiles having different tire treads.

Another object is to provide a transport wherein the means for accommodating the automobiles as aforesaid are readily accessible and may be easily and quickly adjusted as desired.

Other objects, advantages and novel details of construction of this invention will be made more apparent as this description proceeds, especially when considered in connection with the accompanying drawing, wherein:

Figure 1 is a side elevation of a transport embodying my invention with parts broken away and in section;

Figure 2 is a transverse sectional view through the transport taken substantially on the line 2—2 of Figure 1;

Figure 3 is an enlarged fragmentary vertical sectional view through the trailer.

Referring now to the drawing, A is an enclosed automobile transport of the two-deck four-car carrying type having an over-all width of 96 inches as specified by statute. Preferably this transport is a semi-trailer provided at its forward end with a stepped portion I for attachment to a truck and is provided at its rear end with suitable ground-engaging wheels 2. As usual, the lower deck 3 is carried by laterally spaced longitudinally extending beams 4 of substantially Z-cross section, and extends substantially horizontally from the rear end of the transport between the wheel housings 5 to the stepped portion I, while the upper deck 6 is substantially arcuate in configuration and is provided at its rear end with a hingedly mounted portion 7 which may be raised to permit loading of automobiles upon or unloading of automobiles from the lower deck 3.

In the present instance, the upright portions 8 of the wheel housings 5 are adjustable laterally relative to the wheels 2 and have laterally projecting portions 9 slidably mounted upon the top portions 10 of the wheel housings. Any suitable means such as the bolts 11 fixed to the top portions 10 of the wheel housings and engaging slots 12 in the laterally projecting portions 9, and suitable wing nuts 13 adjustably mounted on said bolts 11 may be used for holding the vertical portions 8 in adjusted position.

For guiding automobiles longitudinally and centrally of the lower deck 3 of the transport, I have provided a plurality of angle irons 14 which are spaced laterally apart and are adjustable upon the lower deck 3. As shown, the angle irons 14 are arranged in pairs with the upright portions 15 thereof of each pair spaced apart to receive therebetween the tires of automobiles to be carried. The horizontal portions 16 of said angle irons slidably engage the upper face of the lower deck 3 and are normally clamped against the same by suitable nuts 17 upon bolts 18 extending through the deck 3. As shown, transversely extending slots 19 for the reception of the bolts 18 are provided in the horizontal portions 16 of the angle irons, however it is apparent that such slots may be provided in the lower deck 3 instead, if desired. In either instance the angle irons 14 may be conveniently adjusted over the lower deck 3 toward and away from each other as desired to accommodate tires of different tread.

In use, the vertical portions 8 of the wheel housings may be adjusted to the dotted position illustrated in Figure 2 when automobiles are being loaded into or unloaded from the transport, and may be adjusted to the full line position illustrated in Figure 2 after the automobiles have been loaded and while the transport is in transit. Preferably the construction and arrangement is such that 1⅜ inches clearance for highway operation is provided between each vertical portion 8 and the adjacent ground-engaging wheel 2 when the said vertical portions are in the full line position illustrated in Figure 2. This provides 71⅛ inches between the vertical portions 8 for the loaded automobiles. 70½ inches is the over-all width of the 1935 DeSoto airflow automobile so it is apparent that such an automobile could not be driven into the transport when the vertical portions 8 are in the full line position illustrated in Figure 2 with so little clearance (⅟₁₆ of an inch at each side) without being damaged. On the other hand, after such an automobile has been loaded, the clearance (⅟₁₆ of an inch at each side) between such an automobile and the vertical portions 8 of the wheel housings in their full line position (Figure 2) is O. K. Thus, when it is desired to load automobiles upon the lower deck 3 of the transport, the operator simply loosens the wing nuts 13 and pushes the vertical portions 8 of the wheel housings laterally outwardly to the dotted position illustrated in Figure 2 close to the wheels 2. This provides 73⅞ inches between the vertical portion 8 of the wheel housing and 1¹³⁄₁₆ inches clearance at each side for the automobiles.

The angle irons 14 may also be adjusted according to the tire tread of the automobiles to be loaded so that such automobiles will be guided in a central and straight line longitudinally of the deck 3. For example, if the tread of the front wheels of an automobile to be loaded was smaller than the tread of the rear wheels thereof, then the inner angle irons 14 would be set for the tire tread of the front wheels of the automobiles, while the outer angle irons 14 would be set for the tire tread of the rear wheels of the automobiles, as illustrated by dotted and full lines in Figures 2 and 3. However, if the tread of the front wheels of an automobile to be loaded was greater than the tread of its rear wheels, then the inner angle irons 14 would be set for the tire tread of the rear wheels, while the outer angle irons 14 would be set for the tire tread of the front wheels of the automobile. Thus, such automobiles will be driven in an absolutely straight and central line over the deck 3 without colliding with or being damaged by the upright sides of the transport. After being loaded, the automobiles may be anchored or otherwise held against movement while in transit. The vertical portions 8 of the wheel housings are then moved laterally inwardly to the full line position (Figure 2) so that the space therebetween will be 71⅛ inches. The single nuts 13 are then tightened so that the vertical portions 8 will be held in proper position while the transport is in transit. This same procedure may be followed with automobiles having other over-all widths. In fact, my construction will accommodate automobiles of various widths with safety.

What I claim as my invention is:

1. An automobile transport having a deck for carrying automobiles, and means for guiding automobiles longitudinally of said deck including laterally spaced longitudinally extending members on said deck, said members being arranged in pairs, the inner members of said pairs being adjustable transversely of said deck for guiding engagement with the front wheels of an automobile, and the outer members of said pairs being adjustable transversely of said deck for guiding engagement with the rear wheels of said automobiles.

2. An automobile transport having a deck for carrying automobiles, and adjustable means for guiding automobiles longitudinally of said deck, including laterally spaced longitudinally extending members on said deck, said members being arranged in pairs, the inner members of said pairs being spaced transversely of said deck for guiding engagement with automobile wheels having a predetermined tread, and the outer members of said pairs being spaced transversely of said deck for guiding engagement with automobile wheels having a different tread.

3. An automobile transport having a deck for carrying automobiles wherein the tread of the front wheels is different than the tread of the rear wheels, and means for guiding such automobiles longitudinally of said deck, including laterally spaced longitudinally extending members on said deck, said members being arranged in pairs and individually adjustable transversely of said deck, the inner members of said pairs being engageable with automobile wheels having the smaller tread, and the outer members of said pairs being engageable with the automobile wheels having the larger tread.

4. An automobile transport having a deck for carrying automobiles wherein the tread of the front wheels is smaller than the tread of the rear wheels, and adjustable means for guiding such automobiles longitudinally of said deck, including laterally spaced longitudinally extending members on said deck, said members being arranged in pairs, the inner members of said pairs being engageable with the inner sides of the front wheels, and the outer members of said pairs being engageable with the outer sides of the rear wheels.

5. An automobile transport having an elongated automobile carrying deck, and means adapted during the loading of an automobile having different treads at its front and rear ends, to guide said front and rear ends so that the longitudinal median line of said automobile will be coincident with a given longitudinal line of said deck, including laterally spaced longitudinally extending angle irons on said deck, said angle irons being arranged in pairs, the inner angle irons of said pairs being adjustable transversely of said deck for guiding engagement with the front wheels of said automobile, and the outer angle irons of said pairs being adjustable transversely of said deck for guiding engagement with the rear wheels of said automobile.

IRVING H. JUDD.